US011894593B2

(12) United States Patent
Kuroda

(10) Patent No.: US 11,894,593 B2
(45) Date of Patent: Feb. 6, 2024

(54) FILTER DEVICE, AND ANTENNA MODULE AND COMMUNICATION DEVICE INCLUDING THE SAME

(71) Applicant: Murata Manufacturing Co., Ltd., Kyoto (JP)

(72) Inventor: Katsuhito Kuroda, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 343 days.

(21) Appl. No.: 17/411,847

(22) Filed: Aug. 25, 2021

(65) Prior Publication Data

US 2021/0384596 A1 Dec. 9, 2021

Related U.S. Application Data

(63) Continuation of application No. PCT/JP2020/008125, filed on Feb. 27, 2020.

(30) Foreign Application Priority Data

Mar. 12, 2019 (JP) ................................ 2019-044617

(51) Int. Cl.
*H01P 1/203* (2006.01)
*H01Q 23/00* (2006.01)

(52) U.S. Cl.
CPC ............. *H01P 1/203* (2013.01); *H01Q 23/00* (2013.01)

(58) Field of Classification Search
None
See application file for complete search history.

(56) References Cited

U.S. PATENT DOCUMENTS

2008/0117004 A1 5/2008 Mochizuki
2009/0224989 A1* 9/2009 Youn ...................... H01P 1/203 343/722

(Continued)

FOREIGN PATENT DOCUMENTS

JP H0277904 U 6/1990
JP 2007-142876 A 6/2007

(Continued)

OTHER PUBLICATIONS

International Search Report for International Application No. PCT/JP2020/008125 dated Jun. 16, 2020.

(Continued)

*Primary Examiner* — Wilson Lee
(74) *Attorney, Agent, or Firm* — Pearne & Gordon LLP

(57) ABSTRACT

A filter device (130) is formed between an input end (T1) and an output end (T2), and is configured to attenuate a radio frequency signal in a specific frequency band. The filter device (130) includes a dielectric substrate (140) having a multilayer structure, ground electrodes (GND1 and GND2) formed in the dielectric substrate (140), a first coupling line (132) electrically connected to the input end (T1), a second coupling line (134) electrically connected to the output end (T2), and a stub (133) connected to the first coupling line (132) and the second coupling line (134). The first coupling line (132) and the second coupling line (134) are formed in layers different from layers of the ground electrodes (GND1 and GND2). The first coupling line (132) and the second coupling line (134) are disposed in different layers so as to face each other.

20 Claims, 12 Drawing Sheets

(56) References Cited

U.S. PATENT DOCUMENTS

| | | | | |
|---|---|---|---|---|
| 2014/0035703 | A1 | 2/2014 | Ma et al. | |
| 2016/0094091 | A1* | 3/2016 | Shin | H01Q 1/248 307/104 |
| 2018/0288203 | A1* | 10/2018 | Jeon | H01Q 1/241 |
| 2019/0221937 | A1 | 7/2019 | Onaka et al. | |
| 2019/0379134 | A1* | 12/2019 | Paulotto | H01Q 21/062 |
| 2020/0280131 | A1* | 9/2020 | Avser | H01Q 1/38 |

FOREIGN PATENT DOCUMENTS

| | | | |
|---|---|---|---|
| JP | 2008-131342 | A | 6/2008 |
| JP | 2014-236362 | A | 12/2014 |
| WO | 2018/074377 | A1 | 4/2018 |

OTHER PUBLICATIONS

Written Opinion for International Application No. PCT/JP2020/008125 dated Jun. 16, 2020.

* cited by examiner

FILTER DEVICE, AND ANTENNA MODULE AND COMMUNICATION DEVICE INCLUDING THE SAME

CROSS REFERENCE TO RELATED APPLICATIONS

This is a continuation of International Application No. PCT/JP2020/008125 filed on Feb. 27, 2020 which claims priority from Japanese Patent Application No. 2019-044617 filed on Mar. 12, 2019. The contents of these applications are incorporated herein by reference in their entireties.

BACKGROUND OF THE DISCLOSURE

Field of the Disclosure

The present disclosure relates to a filter device, and an antenna module and communication device including the same, and more particularly, to a technique for reducing the size of the filter device.

Description of the Related Art

Filter devices that filter and remove a signal in a specific frequency band from an input radio frequency signal have been known.

Japanese Unexamined Patent Application Publication No. 2008-131342 (Patent Document 1) discloses a radio frequency filter device including a branch line provided in a direction intersecting with a transmission line and having coupling portions electromagnetically coupled to each other. In the radio frequency filter device disclosed in Japanese Unexamined Patent Application Publication No. 2008-131342 (Patent Document 1), resonance occurs in the radio frequency signal propagated through the branch line and a Q value increases, so that attenuation characteristics can be made steep.

Patent Document 1: Japanese Unexamined Patent Application Publication No. 2008-131342

BRIEF SUMMARY OF THE DISCLOSURE

Such a filter device as described above may be applied to a communication terminal, such as a mobile phone or a smartphone, for example. In such a communication terminal, there is a demand for the reduction in size and thickness of a device, and accordingly, there is a demand for the further reduction in sizes and heights of electronic components mounted therein.

In the case where the filter device is formed of a strip line or a microstrip line, when the height of the filter device is reduced, the distance between a transmission line and a ground electrode is shortened, and therefore the impedance of the transmission line on an input side and an output side may change. As a result, the frequency of an attenuation pole formed by the filter device changes and the steepness of the attenuation characteristics may decrease.

The present disclosure has been made to solve such a problem, and an object of the present disclosure is to realize the reduction in size of a filter device for a radio frequency signal while suppressing the deterioration of the attenuation characteristics of the filter device.

A filter device according to the present disclosure is formed between an input end and an output end and is configured to attenuate a radio frequency signal in a specific frequency band. The filter device includes a dielectric substrate having a multilayer structure, a ground electrode formed in the dielectric substrate, a first coupling line electrically connected to the input end, a second coupling line electrically connected to the output end, and a stub connected to the first coupling line and the second coupling line. The first coupling line and the second coupling line are formed in layers different from a layer of the ground electrode in the dielectric substrate. The first coupling line is disposed in the layer different from the layer of the second coupling line. The first coupling line faces the second coupling line.

According to the filter device of the present disclosure, the two coupling lines (the first coupling line and the second coupling line) connected to the stub are disposed in different layers of the multilayer substrate so as to face each other. As a result, impedance can be reduced in an "odd mode", and the amount of reduction in impedance can be suppressed in an "even mode", so that steep attenuation characteristics can be realized. Therefore, it is possible to reduce the size of the filter device while suppressing the deterioration of the attenuation characteristics of the filter device.

DETAILED DESCRIPTION OF THE DISCLOSURE

Figure 1:
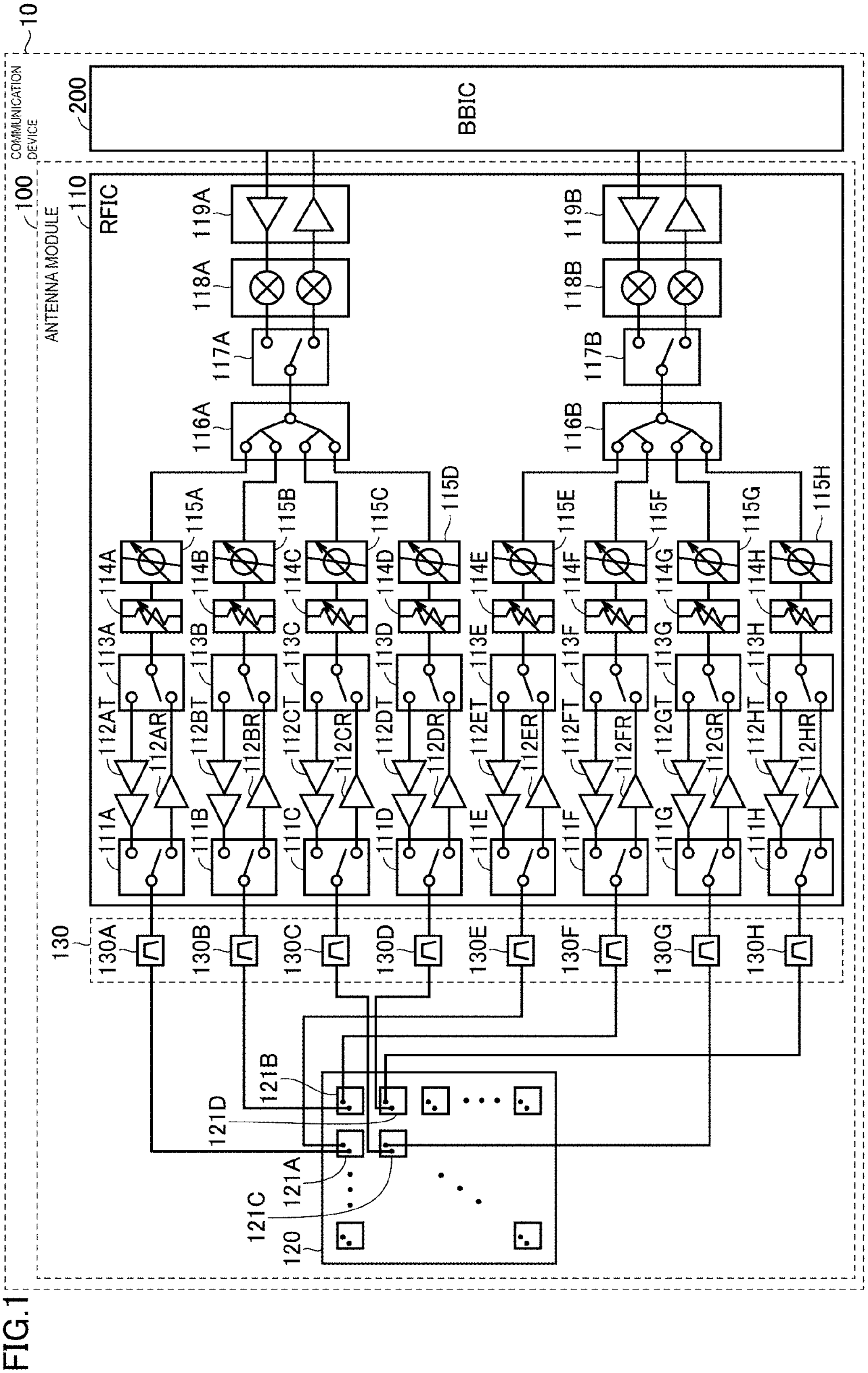
FIG. 1 is a block diagram of a communication device including an antenna module to which a filter device according to Embodiment 1 is applied.

Hereinafter, embodiments of the present disclosure will be described in detail with reference to the accompanying drawings. In the drawings, the same or corresponding portions are denoted by the same reference numerals, and the description thereof will not be repeated.

Embodiment 1

(Basic Configuration of Communication Device)

FIG. 1 is an example of a block diagram of a communication device 10 including an antenna module 100 to which a filter device 130 according to Embodiment 1 is applied. The communication device 10 is, for example, a mobile terminal, such as a mobile phone, a smartphone, or a tablet, or a personal computer having a communication function. An example of a radio wave frequency band used in the antenna module 100 according to the present embodiment is a radio wave in a millimeter wave band having center frequencies of 28 GHz, 39 GHz, 60 GHz, and the like, for example, however, radio waves in frequency bands other than the above are also applicable.

Referring to FIG. 1, the communication device 10 includes the antenna module 100 and a BBIC 200 constituting a baseband signal processing circuit. The antenna module 100 includes an RFIC 110 which is an example of a feed circuit, an antenna device 120, and the filter device 130. The communication device 10 up-converts a signal transmitted from the BBIC 200 to the antenna module 100 into a radio frequency signal and radiates the radio frequency signal from the antenna device 120 via the filter device 130. The communication device 10 down-converts a radio frequency signal received by the antenna device 120 and processes the signal in BBIC 200.

In FIG. 1, for ease of explanation, only configurations corresponding to four feed elements 121A to 121D among a plurality of feed elements (radiation elements) 121 constituting the antenna device 120 are shown, and configurations corresponding to other feed elements 121 having similar configurations are omitted. Although FIG. 1 shows an example in which the antenna device 120 is formed of the plurality of feed elements 121 arranged in a two-dimensional array, the number of feed elements 121 is not necessarily plural, and the antenna device 120 may be formed of a single feed element 121. A single dimensional array in which the plurality of feed elements 121 are arranged in a line may be used. In the present embodiment, the feed element 121 is a patch antenna having a substantially square flat plate shape.

The antenna device 120 of the antenna module 100 shown in FIG. 1 is a so-called dual-polarization type antenna device capable of radiating from each feed element 121 two radio waves having polarization directions different from each other. Therefore, the radio frequency signal for a first polarized wave and the radio frequency signal for a second polarized wave are supplied from the RFIC 110 to each feed element 121.

The RFIC 110 includes switches 111A to 111H, 113A to 113H, 117A and 117B, power amplifiers 112AT to 112HT, low-noise amplifiers 112AR to 112HR, attenuators 114A to 114H, phase shifters 115A to 115H, multiplexers/demultiplexers 116A and 116B, mixers 118A and 118B, and amplifier circuits 119A and 119B. Among them, a configuration of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the multiplexer/demultiplexer 116A, the mixer 118A, and the amplifier circuit 119A constitutes a circuit for the radio frequency signal for the first polarized wave. In addition, a configuration of the switches 111E to 111H, 113E to 113H, and 117B, the power amplifiers 112ET to 112HT, the low-noise amplifiers 112ER to 112HR, the attenuators 114E to 114H, the phase shifters 115E to 115H, the multiplexer/demultiplexer 116B, the mixer 118B, and the amplifier circuit 119B constitutes a circuit for a radio frequency signal for the second polarized wave.

When a radio frequency signal is transmitted, the switches 111A to 111H and 113A to 113H are switched to the power amplifiers 112AT to 112HT, and the switches 117A and 117B are connected to transmission-side amplifiers of the amplifier circuits 119A and 119B. When a radio frequency signal is received, the switches 111A to 111H and 113A to 113H are switched to the low-noise amplifiers 112AR to 112HR, and the switches 117A and 117B are connected to reception-side amplifiers of the amplifier circuits 119A and 119B.

The filter device 130 includes filter devices 130A to 130H. In the following description, the filter devices 130A to 130H may be collectively referred to as the “filter device 130”. The filter devices 130A to 130H are connected to the switches 111A to 111H in the RFIC 110, respectively. As will be described later, each of the filter devices 130A to 130H has a function of attenuating radio frequency signals in a specific frequency band.

A signal transmitted from the BBIC 200 is amplified by the amplifier circuits 119A and 119B and up-converted by the mixers 118A and 118B. Transmission signals, which are up-converted radio frequency signals, are split into four signals by the multiplexers/demultiplexers 116A and 116B, pass through the corresponding signal paths, and are fed to the corresponding one of the feed elements 121.

The radio frequency signals from the switches 111A and 111E are supplied to the feed element 121A via the filter devices 130A and 130E, respectively. Similarly, the radio frequency signals from the switches 111B and 111F are supplied to the feed element 121B via the filter devices 130B and 130F, respectively. The radio frequency signals from the switches 111C and 111G are supplied to the feed element 121C via the filter devices 130C and 130G, respectively. The radio frequency signals from the switches 111D and 111H are supplied to the feed element 121D via the filter devices 130D and 130H, respectively.

The directivity of the antenna device 120 can be adjusted by the phase shift degrees of the phase shifters 115A to 115H, which are arranged in the respective signal paths, being individually adjusted.

A reception signal, which is a radio frequency signal received by each feed element 121, is transmitted to the RFIC 110 via the filter device 130, passes through four different signal paths, and is multiplexed in the multiplexers/demultiplexers 116A and 116B. The multiplexed reception signals are down-converted by the mixers 118A and 118B, amplified by the amplifier circuits 119A and 119B, and transmitted to the BBIC 200.

The RFIC 110 is formed, for example, as a one-chip integrated circuit component including the above-described circuit configuration. Alternatively, the devices (switches, power amplifiers, low-noise amplifiers, attenuators, and phase shifters) in the RFIC 110 corresponding to the feed elements 121 may be formed as one-chip integrated circuit components corresponding to the respective feed elements 121.

(Configuration of Antenna Module)

Figure 2:
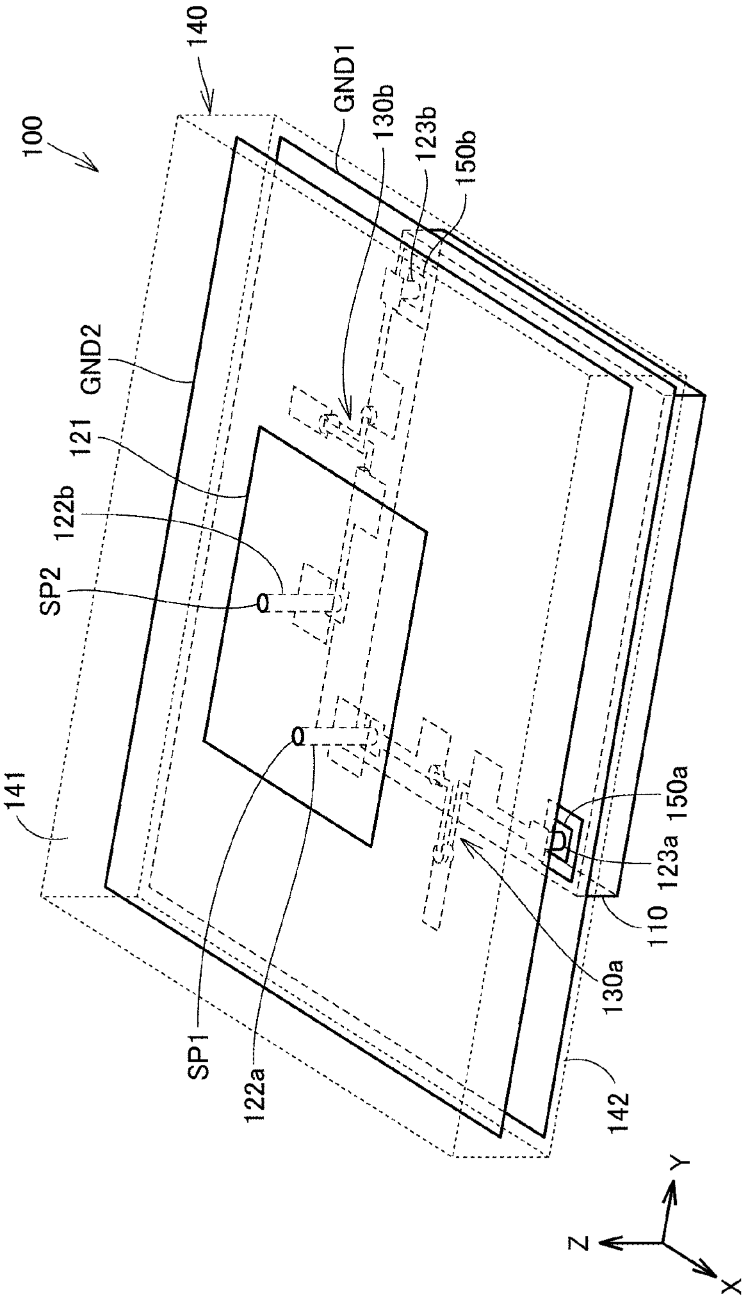
FIG. 2 is an external transparent view of the antenna module of FIG. 1.
Figure 3:
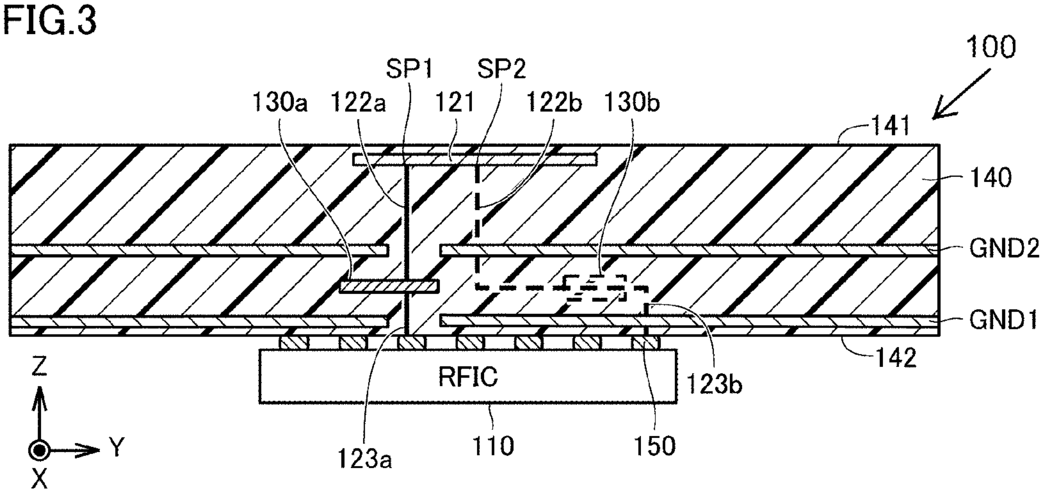
FIG. 3 is a side transparent view of the antenna module of FIG. 1.

Next, a configuration of the antenna module 100 according to Embodiment 1 will be described in detail with reference to FIG. 2 and FIG. 3. FIG. 2 is an external transparent view of the antenna module 100. FIG. 3 is a side transparent view of the antenna module 100. In the following description, as shown in FIG. 2, the thickness direction of the antenna module 100 is defined as a Z-axis direction, and a plane perpendicular to the Z-axis direction is defined by an X-axis and a Y-axis. The positive direction of the Z-axis in each drawing may be referred to as an upper surface side, and the negative direction may be referred to as a lower surface side.

Referring to FIG. 2 and FIG. 3, the antenna module 100 includes, in addition to the feed element 121 and the RFIC 110, a dielectric substrate 140 having a multilayer structure, ground electrodes GND1 and GND2, a filter device 130*a*, and a filter device 130*b*.

The dielectric substrate 140 is, for example, a low temperature co-fired ceramic (LTCC) multilayer substrate, a multilayer resin substrate formed by laminating a plurality of resin layers made of a resin, such as epoxy or polyimide, a multilayer resin substrate formed by laminating a plurality of resin layers made of a liquid crystal polymer (LCP) having a lower dielectric constant, a multilayer resin substrate formed by laminating a plurality of resin layers made of a fluorine-based resin, or a ceramic multilayer substrate other than the LTCC multilayer substrate. Note that the dielectric substrate 140 does not necessarily have a multilayer structure and may be a single-layer substrate.

The dielectric substrate 140 has a substantially rectangular shape, and the feed element 121 is disposed on an upper surface 141 (surface in the positive direction of the Z-axis) side. The feed element 121 may be exposed on the surface of the dielectric substrate 140 or may be disposed inside the dielectric substrate 140 as in the example of FIG. 3. In each embodiment of the present disclosure, for ease of description, a case where only the feed element 121 is used as a radiation element will be described as an example, however, a configuration may be adopted in which a passive element and/or a parasitic element is disposed in addition to the feed element 121.

The ground electrode GND2 is disposed in a layer on a lower surface 142 (surface in the negative direction of the Z-axis) side of the feed element 121 in the dielectric substrate 140 so as to face the feed element 121. In addition, the ground electrode GND1 is disposed in a layer on the lower surface 142 side further than the layer of the ground electrode GND2.

The RFIC 110 is mounted on the lower surface 142 of the dielectric substrate 140 with solder bumps 150 in between. The RFIC 110 may be connected to the dielectric substrate 140 using a multipole connector instead of the solder connection.

As described above, the antenna module 100 is a dual-polarization type antenna module, and radio frequency signals are transmitted from the RFIC 110 to the feed element 121 through two paths. To be more specific, a radio frequency signal is supplied from the RFIC 110 through a connection terminal (solder bump) 150*a* to a feed point SP1 of the feed element 121 via a via 123*a*, the filter device 130*a*, and a via 122*a*. The feed point SP1 is disposed at a position offset from the center of the feed element 121 having a substantially rectangular shape in the negative direction of the Y-axis. Therefore, radio waves whose polarization direction is the Y-axis direction are radiated from the feed element 121 by the radio frequency signal supplied to the feed point SP1.

Similarly, a radio frequency signal is supplied from the RFIC 110 through a connection terminal 150*b* to a feed point SP2 of the feed element 121 via a via 123*b*, the filter device 130*b*, and a via 122*b*. The feed point SP2 is disposed at a position offset from the center of the feed element 121 having a substantially rectangular shape in the negative direction of the X-axis. Therefore, radio waves whose polarization direction is the X-axis direction are radiated from the feed element 121 by the radio frequency signal supplied to the feed point SP2.

The filter device 130*a* and the filter device 130*b* are formed in a layer between the ground electrode GND1 and the ground electrode GND2. The vias 123*a* and 123*b* penetrate the ground electrode GND1 and connect the RFIC 110 to the filter device 130*a* and the filter device 130*b*, respectively. The vias 122*a* and 122*b* penetrate the ground electrode GND2 and connect the filter device 130*a* to the feed point SP1 and the filter device 130*b* to the feed point SP2, respectively.

Although the configurations of the filter device 130*a* and the filter device 130*b* will be described later with reference to FIGS. 4A and 4B, they have a function of attenuating a signal in a specific frequency band of a radio frequency signal supplied from the RFIC 110 to the feed element 121. As a result, it is possible to inhibit unnecessary waves from being radiated from the feed element 121 and to remove unnecessary waves in the radio frequency signal received by the feed element 121. Each filter device is realized, for example, by a distributed constant line, specifically by a stub.

The "via 122*a*" described above corresponds to a "first feed line" of the present disclosure, and the "via 122*b*" corresponds to a "second feed line" of the present disclosure.

(Description of Filter Device)

Figure 4A:
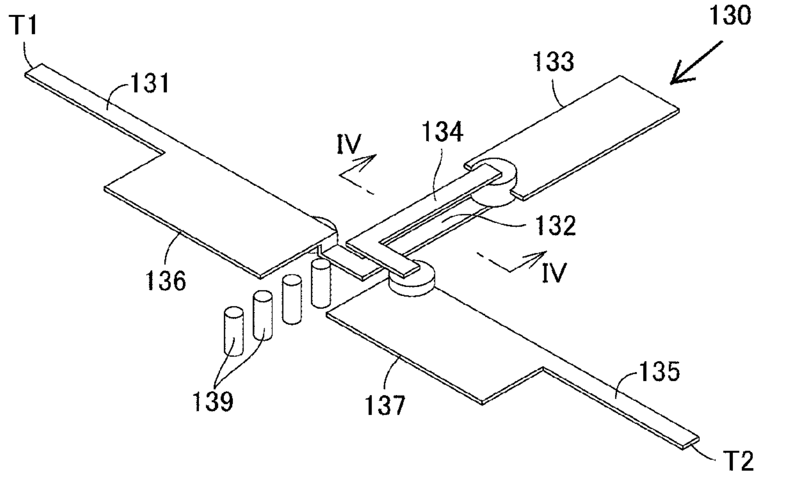
FIGS. 4A and 4B are a perspective view and a sectional view of the filter device in FIG. 1.
Figure 4B:
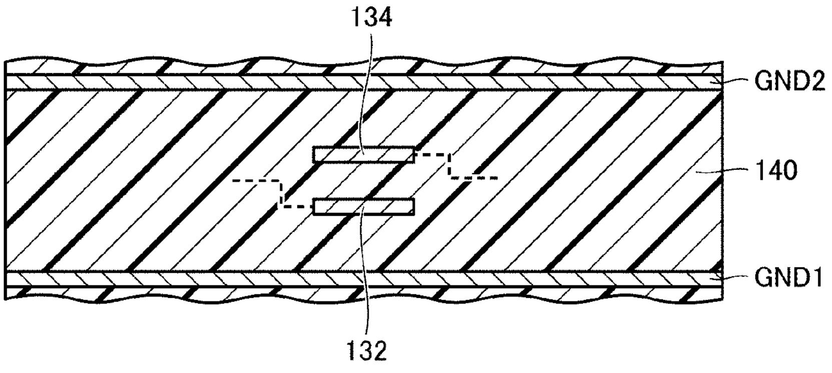

Each of FIGS. 4A and 4B is a diagram for explaining the filter device 130 according to Embodiment 1. In FIGS. 4A and 4B, FIG. 4A on the upper side shows a perspective view of the filter device 130, and FIG. 4B on the lower side shows a sectional view taken along a line IV-IV of FIG. 4A. In FIG. 4A, the dielectric substrate and the ground electrodes are omitted for ease of explanation.

Referring to FIGS. 4A and 4B, the filter device 130 includes transmission lines 131 and 135, coupling lines 132 and 134, a stub 133, matching lines 136 and 137, and a via 139. One end of the transmission line 131 is connected to an input end T1, and the other end of the transmission line 131 is connected to one end of the coupling line 132 via the matching line 136. The other end of the coupling line 132 is connected to one end of the coupling line 134 and is also connected to the stub 133. The other end of the coupling line 134 is connected to one end of the transmission line 135 via the matching line 137, and the other end of the transmission line 135 is connected to an output end T2.

The transmission lines 131 and 135, the coupling lines 132 and 134, the stub 133, and the matching lines 136 and 137 forming the filter device 130 are all formed as flat plate wiring patterns. Here, as shown in FIG. 4B, the coupling line 132 and the coupling line 134 are disposed in different layers of the dielectric substrate 140 and face each other in the direction in which each line extends. The coupling line 132 and the coupling line 134 are connected by a via, and the stub 133 is connected to the via.

When the wavelength of the radio frequency signal to be attenuated by the stub 133 is λ, each of the transmission lines 131 and 135, the coupling lines 132 and 134, the stub 133, and the matching lines 136 and 137 has a length of λ/4.

The matching lines 136 and 137 have a function of matching the impedance between the transmission lines 131 and 135 and the coupling lines 132 and 134. Therefore, when the impedance between the transmission lines 131 and 135 and the coupling lines 132 and 134 is appropriately matched, the transmission lines 131 and 135 may not be provided. Although each of FIGS. 4A and 4B shows an example in which the coupling line and the transmission line are disposed in different layers of the dielectric substrate 140 and are connected by the via, the transmission line and the coupling line may be formed in the same layer.

A plurality of vias 139 are disposed between the matching line 136 and the matching line 137. Although not shown in FIGS. 4A and 4B, each of the vias 139 is connected to a ground electrode. The via 139 functions as a shielding wall for suppressing the electromagnetic coupling between the matching line 136 and the matching line 137. Note that the vias 139 are omitted in the drawings of filter devices in other embodiments described below. The via 139 corresponds to a "shielding portion" in the present disclosure.

Next, the effects of the filter device 130 according to Embodiment 1 will be described with reference to a filter device 130# of a comparative example shown in FIGS. 5A and 5B.

Figure 5A:
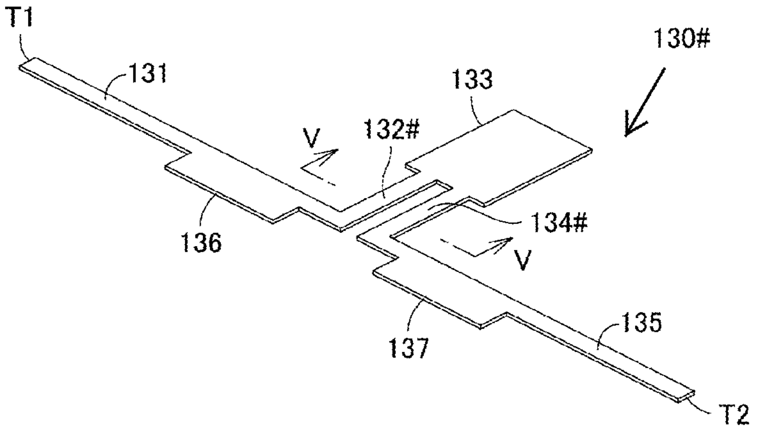
FIGS. 5A and 5B are a perspective view and a sectional view of a filter device according to a comparative example.
Figure 5B:
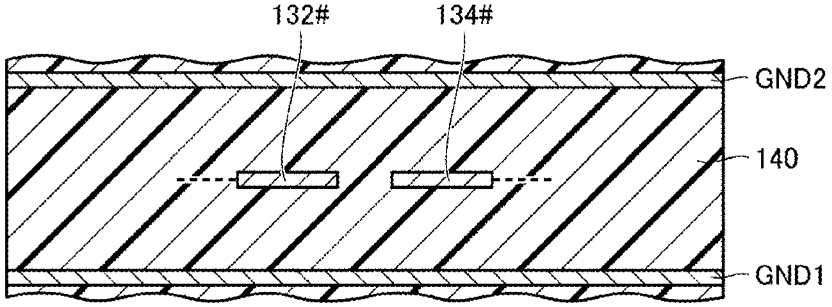

Each of FIGS. 5A and 5B is a view showing a filter device 130# according to the comparative example, and as with FIGS. 4A and 4B, FIG. 5A on the upper side shows a perspective view of the filter device 130#, and FIG. 5B on the lower side shows a sectional view taken along a line V-V of FIG. 5A. Also, in FIG. 5A, the dielectric substrate and the ground electrodes are omitted for ease of explanation.

The filter device 130# of the comparative example differs from the filter device 130 of Embodiment 1 in the arrangement of the coupling lines 132# and 134#. Specifically, as shown in the sectional view of FIG. 5B, the coupling lines 132# and 134# of the filter device 130# are arranged in parallel on the same layer of the dielectric substrate 140 such that the side surfaces of the wiring patterns face each other.

Figure 6:
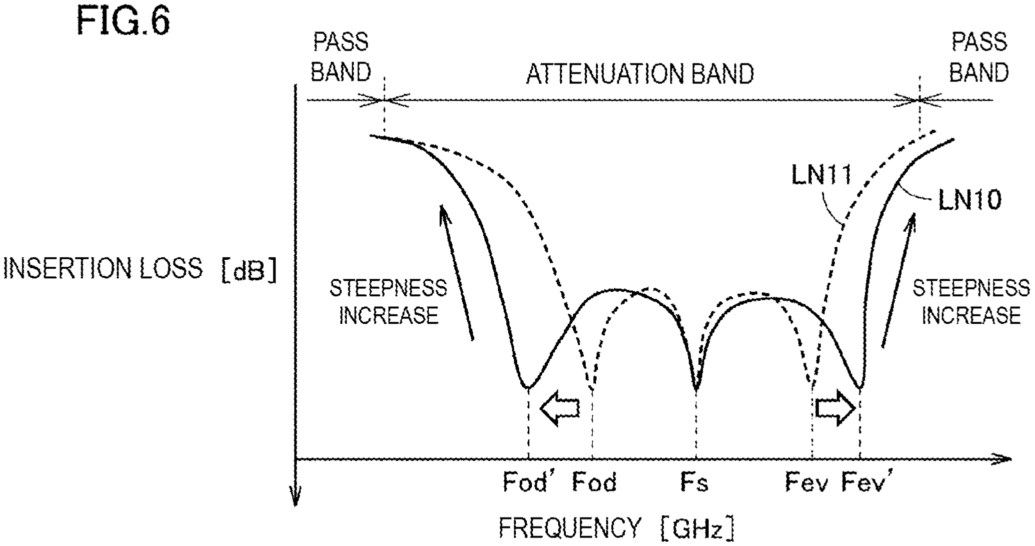
FIG. 6 is a graph for explaining attenuation characteristics in Embodiment 1 and the comparative example.

In such a filter device, as indicated by the broken line LN11 in FIG. 6, an attenuation pole is produced at frequency Fs corresponding to the lengths of the stub 133, and an additional attenuation pole is produced in an attenuation band corresponding to the impedance due to the electromagnetic coupling between the two coupling lines.

Here, regarding the impedance of the coupling lines, there are an "even mode" in which currents flow in the same direction in the two coupling lines and an "odd mode" in which currents flow in opposite directions in the two coupling lines. In general, the impedance in the "even mode" is larger than the impedance in the "odd mode". Due to the impedance of the two modes, in the attenuation band, an attenuation pole in the "odd mode" is produced at a frequency Fod lower than the frequency Fs, and an attenuation pole in the "even mode" is produced at a frequency Fev higher than the frequency Fs.

The frequencies Fod and Fev of the attenuation pole produced by the impedance of the coupling lines vary depending on the magnitude of the impedance. Therefore, as shown by the solid line LN10 in FIG. 6, the degree of attenuation can be made steep by bringing these attenuation poles close to the end portions of the attenuation band. In addition, by increasing the steepness of the attenuation characteristics at the boundary between the pass band and the attenuation band, the pass band width can be increased. Therefore, in order to improve the attenuation characteristics of the filter device, it is desirable that the impedance in the "odd mode" be low and the impedance in the "even mode" be high.

The filter device according to the present disclosure may be applied to a communication terminal, such as a mobile phone or a smartphone, for example. In such a communication terminal, there is a demand for the reduction in size and thickness of the device, and accordingly, there is a demand for the further reduction in size and height of electronic components mounted therein. As shown in FIGS. 4A and 4B and FIGS. 5A and 5B, in the case where the filter device is formed as a strip line disposed between two ground electrodes, and when the height of the filter device is reduced, the distance between the coupling line and the ground electrode is short, and the impedance of the coupling lines may change. As a result, the frequency of the attenuation pole formed by the filter device changes and the steepness of the attenuation characteristics may decrease.

Figure 7:
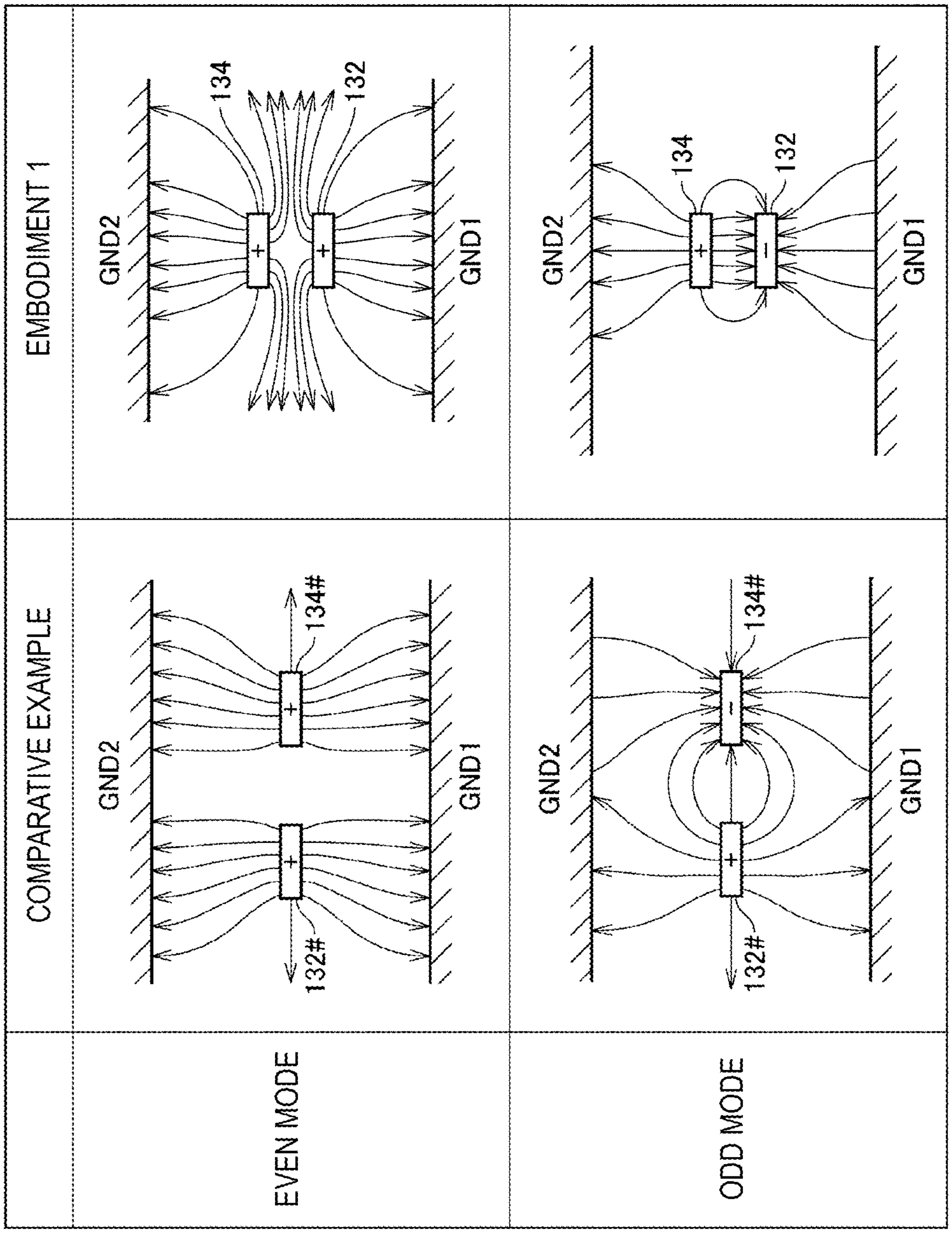
FIG. 7 is a diagram for explaining impedance of the filter device.

FIG. 7 is a diagram for explaining the impedance due to the arrangement of the coupling lines and shows the lines of the electric force generated between the coupling lines and between the coupling lines and the ground electrodes in the filter device 130# of the comparative example and the filter device 130 of Embodiment 1.

Referring to FIG. 7, in the case of the "even mode", since the polarities of the coupling lines are the same, no lines of electric force are generated between the coupling lines, and most of the lines of electric force are generated between the coupling lines and the ground electrodes. That is, the impedance in the "even mode" depends on the degree of coupling between the coupling line and the ground electrode.

In the comparative example, in the case where the coupling lines 132# and 134# are arranged in parallel at equal distances from the ground electrodes, when the interval between the ground electrodes is narrowed, the coupling with the ground electrodes is strengthened on both main surfaces of the coupling lines. Therefore, the impedances of the coupling lines 132# and 134# become small.

On the other hand, in the case of Embodiment 1, since the coupling between the ground electrode and the surface where the coupling lines face each other does not change, even when the interval between the coupling line and the ground electrode is narrowed, the degree of decrease in impedance is smaller than that in the comparative example. Therefore, in the "even mode", when the interval between the coupling line and the ground electrode is narrowed, the impedance is higher in Embodiment 1 than in the comparative example.

On the other hand, in the "odd mode", since the polarities of the coupling lines are different from each other, many lines of electric force are generated between the two coupling lines. That is, the impedance in the "odd mode" depends on the degree of coupling between the coupling lines. Therefore, in both of the comparative example and Embodiment 1, even when the interval between the coupling line and the ground electrode is narrowed, the influence on the impedance is basically small. However, as compared with the comparative example in which the side surfaces of the coupling lines face each other, in Embodiment 1 in which the main surfaces of the coupling lines face each other, the facing area between the lines is larger, and thus the coupling lines are easily coupled to each other. Therefore, in the "odd mode", the impedance tends to be lower in Embodiment 1 than in the comparative example.

As described above, when the interval between the coupling line and the ground electrode is narrowed, the filter device 130 according to Embodiment 1 has an attenuation pole closer to an end portion side in the attenuation band than the filter device 130# of the comparative example. Therefore, by adopting the configuration of the filter device 130 according to Embodiment 1, it is possible to suppress a decrease in the steepness of the attenuation characteristics.

Figure 8:
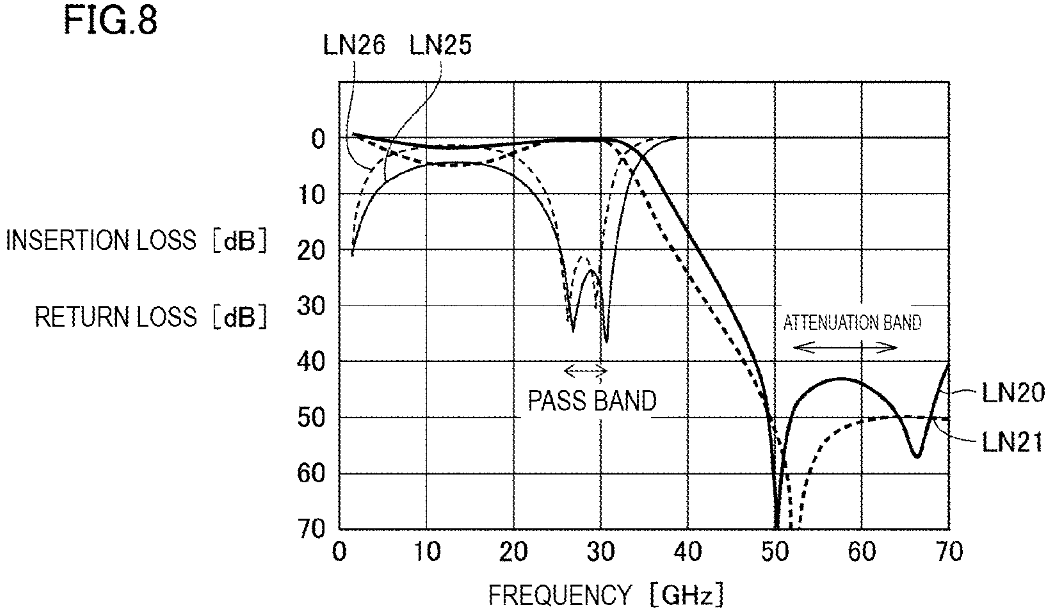
FIG. 8 is a graph for explaining the comparison of the filter characteristics between Embodiment 1 and the comparative example.
Figure 9:
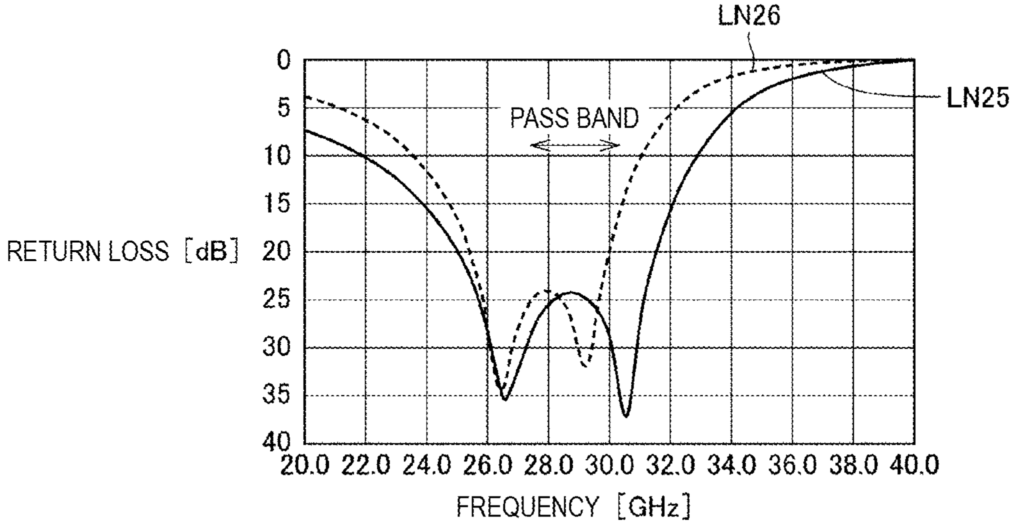
FIG. 9 is a partially enlarged view of the graph of return loss in FIG. 8.
Figure 10:
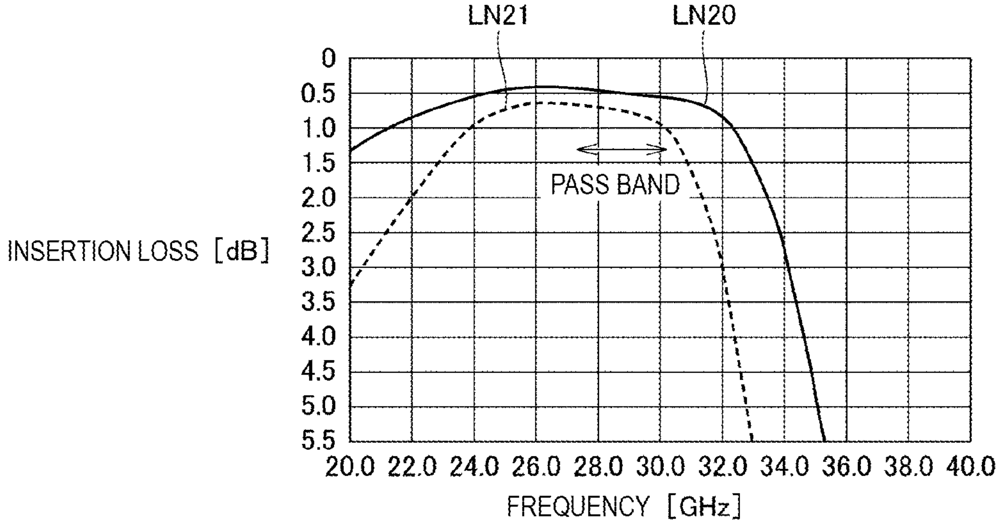
FIG. 10 is a partially enlarged view of the graph of insertion loss in FIG. 8.

FIG. 8 to FIG. 10 are graphs for explaining the comparison of the filter characteristics between the filter device 130 of Embodiment 1 described above and the filter device 130# of the comparative example. In FIG. 8, a horizontal axis represents the frequency, and a vertical axis represents the insertion loss and return loss.

In FIG. 8, the solid line LN20 indicates the insertion loss in Embodiment 1, and the broken line LN21 indicates the insertion loss in the comparative example. The solid line LN25 indicates the return loss in Embodiment 1, and the broken line LN26 indicates the return loss in the comparative example. FIG. 9 and FIG. 10 are enlarged views of the return loss and insertion loss in the vicinity of the pass band in FIG. 8.

Referring to FIG. 8, when the insertion loss in the attenuation band is compared, Embodiment 1 (the solid line LN20) has an attenuation pole at lower frequencies than the comparative example (the broken line LN21), and the steepness particularly in the vicinity of 30 to 50 GHz is improved.

In FIG. 9 and FIG. 10, in the vicinity of the pass band, the return loss and the insertion loss of Embodiment 1 are smaller than those of the comparative example, and the bandwidth in which the desired bandpass characteristics can be realized is increased.

Figure 11:
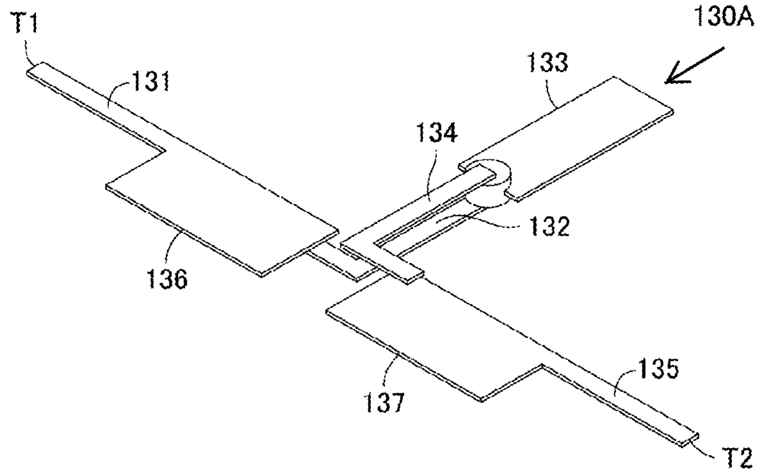
FIG. 11 is a perspective view of a filter device according to a modified example.

Although the configuration in which the coupling line 132 and the matching line 136 are directly connected to each other and the coupling line 134 and the matching line 137 are directly connected to each other has been described in FIG. 4A, a configuration in which the coupling line and the matching line are capacitively coupled to each other in a non-contact manner as shown in a filter device 130A of a modified example of FIG. 11 may be employed.

As described above, in the filter device having the two coupling lines both connected to the stub, by forming the two coupling lines in different layers so as to face each other, it is possible to suppress a decrease in the steepness of the attenuation characteristics even when the distance between the filter device and the ground electrode is reduced. Therefore, by adopting the configuration of the filter device as in Embodiment 1, it is possible to reduce the size of the filter device while suppressing the deterioration of the characteristics of the filter device.

Embodiment 2

In Embodiment 1, the example in which the two coupling lines of the filter device having the same line width has been described. However, when the filter device is manufactured, there is a possibility that the positions of the coupling lines formed in different layers are shifted due to manufacturing variations. In this case, an intended impedance may not be achieved, and the desired filter characteristics may not be obtained.

Therefore, in Embodiment 2, a configuration will be described in which the line width of one of the two coupling lines is made wider than the line width of the other coupling line, thereby reducing variations in characteristics due to misalignment of the coupling lines.

Figure 12A:
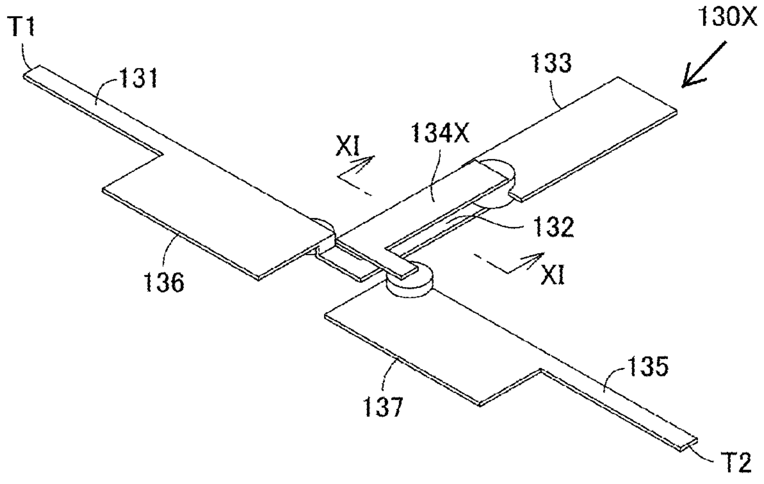
FIGS. 12A and 12B are a perspective view and a sectional view of a filter device according to Embodiment 2.
Figure 12B:
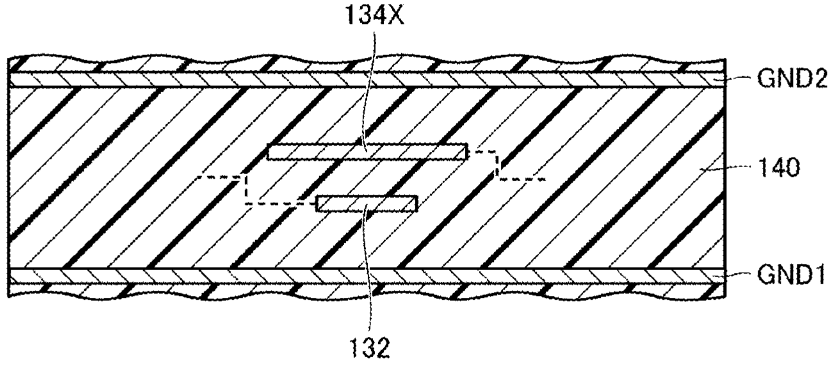

Each of FIGS. 12A and 12B is a diagram for explaining a filter device 130X according to Embodiment 2. In FIGS. 12A and 12B, FIG. 12A on the upper side shows a perspective view of the filter device 130X, and FIG. 12B on the lower side shows a sectional view taken along a line XI-XI of FIG. 12A. Also, in FIG. 12A, the dielectric substrate and the ground electrodes are omitted for ease of explanation.

Referring to FIGS. 12A and 12B, the filter device 130X is configured such that the line width of coupling line 134X on the output side is wider than the line width of coupling line 132 on the input side, as compared with filter device 130 of Embodiment 1. As a result, even when the input side coupling line 132 is shifted, the facing area of the two coupling lines can be ensured, and the deterioration of the filter characteristics due to manufacturing variations can be prevented.

In FIGS. 12A and 12B, an example in which the line width of the coupling line on the output side is increased has been described, but instead, it may be an aspect in which the line width of the coupling line on the input side is increased. When the line width of the coupling line is made too wide, the coupling between the coupling line and the ground electrode is strong, so that there is a possibility that the steepness is reduced. Therefore, the line width of the coupling line is preferably designed in accordance with the allowable filter characteristics.

Embodiment 3

As shown in FIG. 8, in order to improve the steepness between the pass band and the attenuation band when the frequency band of the attenuation band is higher than that of the pass band, it is necessary to lower the frequency of the attenuation pole, that is, the attenuation pole in the "odd mode", closest to the pass band in the attenuation band as much as possible (that is, to lower the impedance).

As described with reference to FIG. 7, in the "odd mode", the impedance decreases as the coupling between the coupling lines increases. Therefore, in Embodiment 3, a configuration will be described in which one of the coupling lines is arranged in a plurality of layers to enhance the coupling between the coupling lines so that the steepness of the attenuation characteristics is improved.

Figure 13A:
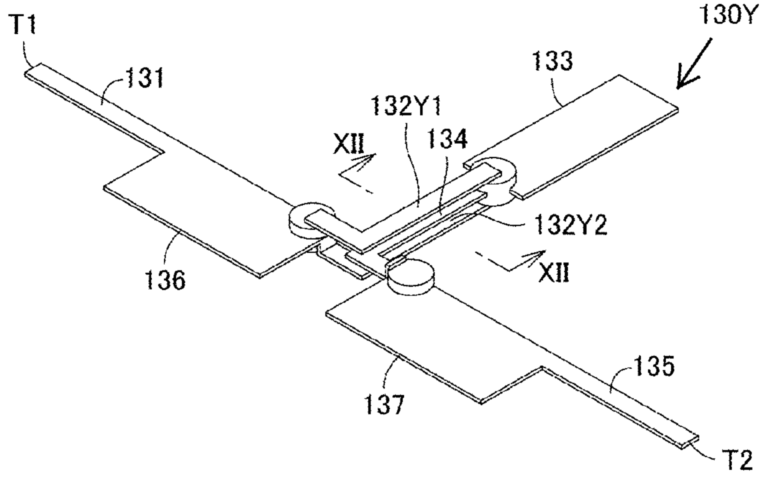
FIGS. 13A and 13B are a perspective view and a sectional view of a filter device according to Embodiment 3.
Figure 13B:
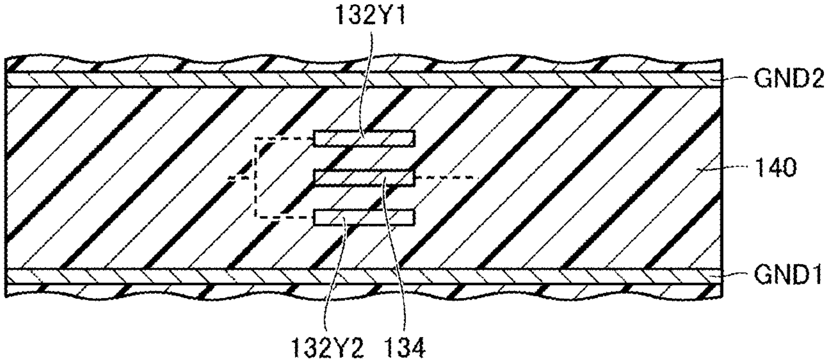

Each of FIGS. 13A and 13B is a diagram for explaining a filter device 130Y according to Embodiment 3. In FIGS. 13A and 13B, FIG. 13A on the upper side shows a perspective view of the filter device 130Y, and FIG. 13B on the lower side shows a sectional view taken along a line XII-XII of FIG. 13A. Also, in FIG. 13A, the dielectric substrate and the ground electrodes are omitted for ease of explanation.

Referring to FIGS. 13A and 13B, in the filter device 130Y, two coupling lines 132Y1 and 132Y2 are provided as input side coupling lines. The coupling line 132Y1 and the coupling line 132Y2 are formed in layers different from each other, and are electrically connected in parallel between the matching line 136 and the stub 133.

The output side coupling line 134 is formed in a layer between the coupling line 132Y1 and the coupling line 132Y2, and the coupling line 134 faces the coupling line 132Y1 and the coupling line 132Y2.

With such a configuration, the capacitance between the input side coupling line and the output side coupling line can be increased, and thus the impedance in the "odd mode" can be further reduced as compared with the filter device 130 according to Embodiment 1. As a result, the frequency of the attenuation pole of the "odd mode" in the attenuation band can be made closer to the pass band, so that the steepness of the attenuation characteristics can be improved.

In the example of FIGS. 13A and 13B, the configuration in which the input side coupling lines are arranged in a plurality of layers has been described, but instead of and/or in addition to this, the output side coupling lines may be arranged in a plurality of layers.

Embodiment 4

In Embodiment 4, a configuration in which the features of Embodiment 2 and Embodiment 3 described above are combined will be described. That is, in the filter device according to Embodiment 4, at least one of the coupling lines is arranged in a plurality of layers, and the line width of the coupling line is further increased.

Figure 14A:
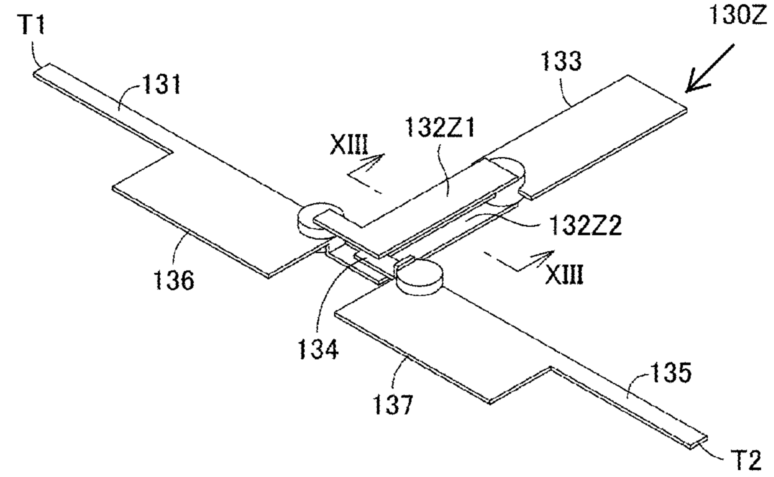
FIGS. 14A and 14B are a perspective view and a sectional view of a filter device according to Embodiment 4.
Figure 14B:
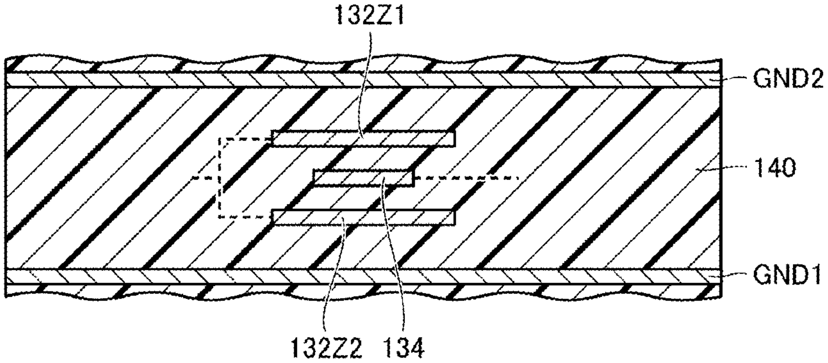

Each of FIGS. 14A and 14B is a diagram for explaining a filter device 130Z according to Embodiment 4. In FIGS. 14A and 14B, FIG. 14A on the upper side shows a perspective view of the filter device 130Z, and FIG. 14B on the lower side shows a sectional view taken along a line XIII-XIII in FIG. 14A. Also, in FIG. 14A, the dielectric substrate and the ground electrodes are omitted for ease of explanation.

Referring to FIGS. 14A and 14B, in the filter device 130Z, as with the filter device 130Y of Embodiment 3, two coupling lines 132Z1 and 132Z2 are provided as input side coupling lines. The coupling line 132Z1 and the coupling line 132Z2 are formed in layers different from each other, and are electrically connected in parallel between the matching line 136 and the stub 133. The output side coupling line 134 is formed in a layer between the coupling line 132Z1 and the coupling line 132Z2, and the coupling line 134 faces the coupling line 132Z1 and the coupling line 132Z2.

Further, in the filter device 130Z, the line widths of the coupling lines 132Z1 and 132Z2 on the input side are wider than the line width of the coupling line 134 on the output side.

With such a configuration, the capacitance between the input side coupling line and the output side coupling line can be increased, and the facing area between the coupling lines can be appropriately ensured even when the coupling lines are misaligned during manufacturing. Therefore, it is possible to enhance the steepness of the attenuation characteristics and to prevent the deterioration of the filter characteristics due to manufacturing variations.

Also, in Embodiment 4, the output side coupling lines may be arranged in a plurality of layers. The line width of the output side coupling line may be made wider than the line width of the input side coupling line.

Modified Example of Antenna Module

Modification 1

In Embodiment 1, as shown in FIG. 2 and FIG. 3, the configuration of the filter device corresponding to each polarized wave being arranged between the ground electrode GND1 and the ground electrode GND2 has been described. In this case, in order to suppress the electromagnetic coupling between the two filter devices, it is necessary to arrange the two filter devices as far as possible from each other in plan view of the antenna module. In this case, in the array antenna having a plurality of feed elements as shown in FIG. 1, it is necessary to increase the area of the dielectric substrate in order to secure a space for forming the filter device, which may be a factor of impeding the reduction in size of the antenna module.

In the antenna module according to Modification 1, the filter devices corresponding to the respective polarized waves are formed in different layers of the dielectric substrate, and the ground electrode is disposed between the two filter devices. With such a configuration, even when the two filter devices are arranged so as to partially overlap each other in plan view of the antenna module, electromagnetic coupling between the filter devices corresponding to two polarized waves can be suppressed by the ground electrode between the filter devices.

Figure 15:
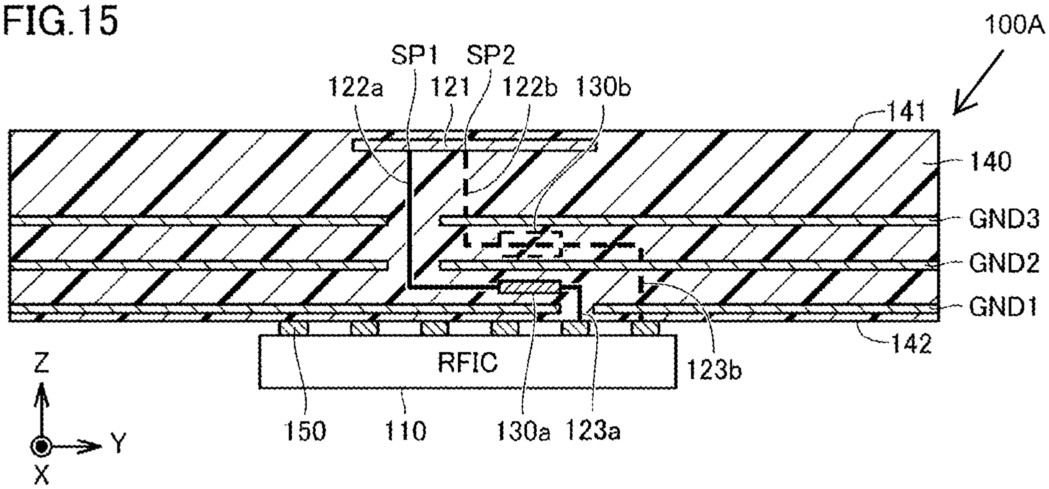
FIG. 15 is a side transparent view of an antenna module according to Modification 1.

FIG. 15 is a side transparent view of an antenna module 100A according to Modification 1. The antenna module 100A has a configuration in which a ground electrode GND3 is further added to the configuration of the antenna module 100 of Embodiment 1. The ground electrode GND3 is disposed in a layer between the feed element 121 and the ground electrode GND2.

The filter device 130*a* in the path from the RFIC 110 to the feed point SP1 is formed between the ground electrode GND1 and the ground electrode GND2. On the other hand, the filter device 130*b* in the path from the RFIC 110 to the feed point SP2 is formed between the ground electrode GND2 and the ground electrode GND3.

In the antenna module 100A, at least a part of the filter device 130*a* is disposed so as to overlap with the filter device 130*b* when viewed in plan in a direction normal to the antenna module 100A.

In the configuration of the antenna module 100A, even when the filter device 130*a* and the filter device 130*b* are disposed so as to overlap each other in plan view of the antenna module 100A, the coupling between the two filter devices can be prevented by the ground electrode GND2 disposed between the two filter devices. This makes it possible to reduce the size of the antenna module while suppressing the deterioration in the filter characteristics.

As shown in FIG. 15, in the configuration of Modification 1, each of the filter devices is arranged in different layers, but in order to suppress an increase in the thickness of the dielectric substrate, it is necessary to narrow the interval between the ground electrodes. Therefore, as the filter device, the configuration in which the coupling lines face each other in the interlayer direction as described in the above embodiment is effective in preventing the deterioration of the attenuation characteristics.

Modification 2

In the antenna module 100 shown in FIG. 1, the configuration in which the filter device 130 is connected between the RFIC 110 and the antenna device 120 has been described. In this case, since the number of filter devices corresponding to the number of feed elements is required, the size of the entire antenna module may increase.

As described with reference to FIG. 1, radio frequency signals transmitted and received by the antenna device 120 are branched and multiplexed by multiplexers/demultiplexers 116 (branch circuit) in the RFIC 110. In Modification 2, a configuration will be described in which the number of filter devices is reduced by disposing the filter device at a position before branching (after multiplexing) in the branch circuit included in the RFIC, and reducing the size of the antenna module.

Figure 16:
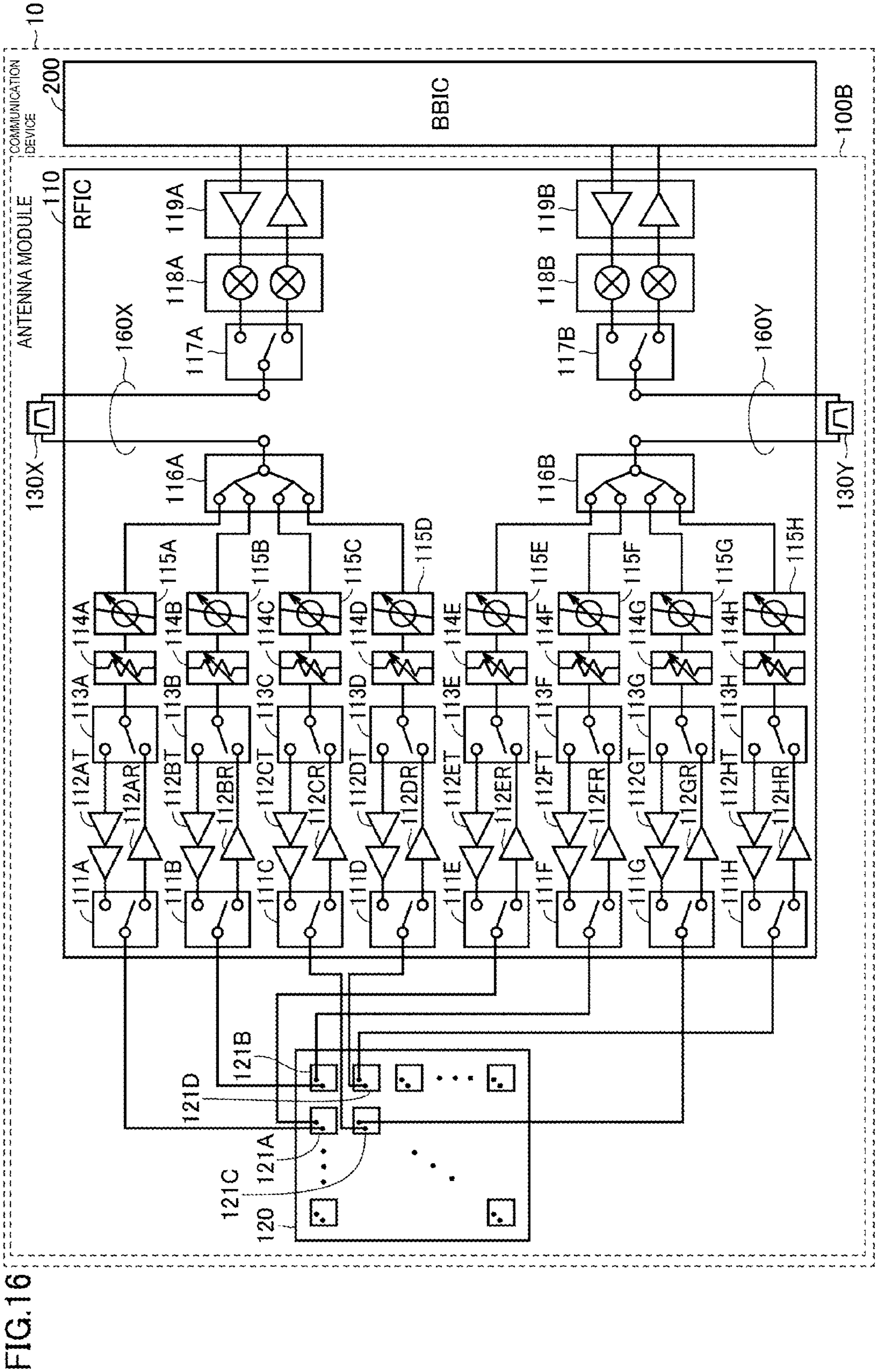
FIG. 16 is a block diagram of a communication device including an antenna module according to Modification 2.

FIG. 16 is a block diagram of the communication device 10 including an antenna module 100B in Modification 2. In the antenna module 100B, the filter device 130 disposed on the path for transmitting radio frequency signals from the RFIC 110 to each feed element 121 of the antenna device 120 in the antenna module 100 shown in FIG. 1 is removed. Instead, in the RFIC 110, the filter device 130X is disposed between a multiplexer/demultiplexer 116A for the first polarized wave and the switch 117A, and the filter device 130Y is disposed between a multiplexer/demultiplexer 116B for the second polarized wave and the switch 117B.

The filter devices 130X and 130Y are disposed outside the RFIC 110, and are connected to circuits inside the RFIC 110 by extended lines 160X and 160Y, respectively. To be more specific, as shown in the side transparent view of the antenna module 100B in FIG. 17, the filter devices 130X and 130Y are formed between the ground electrode GND1 and the ground electrode GND2 of the dielectric substrate 140, and the input ends and output ends thereof are connected to the corresponding connection terminals (solder bumps 150) of the RFIC 110. In this case, the radio frequency signal from the RFIC 110 to the feed element 121 is transmitted by the feed lines 122X and 122Y.

Figure 17:
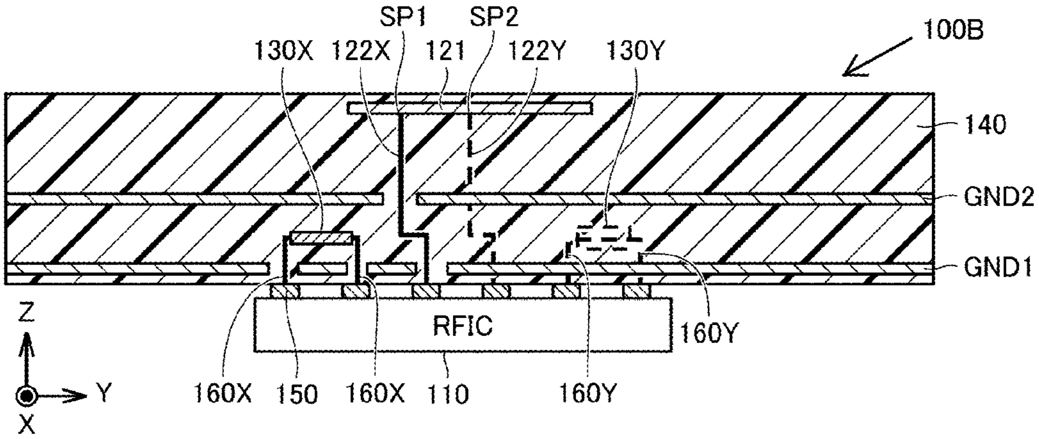
FIG. 17 is a side transparent view of the antenna module in FIG. 16.

In FIG. 16 and FIG. 17, the filter devices 130X and 130Y are formed as circuits outside the RFIC 110, but may be formed as circuits inside the RFIC 110.

With the configuration like the antenna module 100B, one filter device may be provided for each polarized wave circuit, and therefore the number of filter devices as the entire antenna module can be reduced. This can contribute to the reduction in size of the antenna module.

In each of the filter devices according to the above-described embodiments and modifications, the dielectric constant of the dielectric disposed between the coupling lines may be different from the dielectric constant of the dielectric disposed between the coupling lines and the ground electrode. In particular, when the dielectric constant of the dielectric between the coupling lines is made larger than the dielectric constant of the dielectric between the coupling lines and the ground electrode, the coupling between the coupling lines can be increased, and thus the effect of the present disclosure can be further enhanced.

In each filter device, a space may be formed in at least a part of the dielectric between the coupling line and the ground electrode to reduce the effective dielectric constant between the coupling line and the ground electrode.

In the above-described example, the configuration in which the coupling line and the ground electrode of the filter device are formed in the same dielectric substrate has been described, but a configuration in which the substrate on which the coupling line is formed and the substrate on which the ground electrode is formed are formed on separate substrates may be employed.

In the examples of the filter devices described above, the configuration in which the coupling line is disposed between the two ground electrodes has been described, however, a configuration in which one of the ground electrodes is not provided may be employed.

It should be understood that the embodiments disclosed herein are illustrative and non-restrictive in every respect. The scope of the present disclosure is defined not by the description of the embodiments described above but by the claims, and is intended to include all modifications within the meaning and scope equivalent to the claims.

10 COMMUNICATION DEVICE
100, 100A, 100B ANTENNA MODULE
110 RFIC
140 DIELECTRIC SUBSTRATE
111A to 111H, 113A to 113H, 117A, 117B SWITCH
112AR to 112HR LOW-NOISE AMPLIFIER
112AT to 112HT POWER AMPLIFIER
114A to 114H ATTENUATOR
115A to 115H PHASE SHIFTER
116, 116A, 116B MULTIPLEXER/DEMULTIPLEXER
118A, 118B MIXER
119A, 119B AMPLIFIER CIRCUIT
120 ANTENNA DEVICE
121, 121A to 121D FEED ELEMENT
122X, 122Y FEED LINE
122*a*, 122*b*, 123*a*, 123*b*, 139 VIA
130, 130A to 130*h*, 130X to 130Z, 130*a*, 130*b* FILTER DEVICE
131, 135 TRANSMISSION LINE
132, 132Y1, 132Y2, 132Z1, 132Z2, 134, 134X COUPLING LINE
133 STUB
136, 137 MATCHING LINE
141 UPPER SURFACE
142 LOWER SURFACE
150 SOLDER BUMP
160X, 160Y EXTENDED LINE
200 BBIC
GND1 to GND3 GROUND ELECTRODE
SP1, SP2 FEED POINT
T1 INPUT END
T2 OUTPUT END

The invention claimed is:

1. A filter device provided between an input end and an output end and configured to attenuate a radio frequency signal in a specific frequency band, the filter device comprising:
- a dielectric substrate having a multilayer structure;
- a first ground electrode provided in the dielectric substrate;
- a first coupling line provided in a layer different from a layer of the first ground electrode and electrically connected to the input end;
- a second coupling line provided in a layer different from the layer of the first ground electrode and electrically connected to the output end; and
- a stub connected to the first coupling line and the second coupling line,
- wherein the first coupling line and the second coupling line are disposed in different layers of the dielectric substrate, and the first coupling line faces the second coupling line.

2. The filter device according to claim 1,
wherein a line width of the first coupling line is different from a line width of the second coupling line.

3. The filter device according to claim 1, further comprising:
- a third coupling line electrically connected in parallel to the first coupling line,
- wherein the second coupling line is provided between the first coupling line and the third coupling line.

4. The filter device according to claim 1, further comprising:
- a fourth coupling line electrically connected in parallel to the second coupling line,
- wherein the first coupling line is provided between the second coupling line and the fourth coupling line.

5. The filter device according to claim 1, further comprising:
- a first matching line connected between the input end and the first coupling line; and
- a second matching line connected between the output end and the second coupling line.

6. The filter device according to claim 5, further comprising:
- a shielding portion for suppressing electromagnetic coupling between the first matching line and the second matching line.

7. The filter device according to claim 1,
wherein the stub is an open stub.

8. An antenna module comprising at least one filter device according to claim 1, the antenna module further comprising:
- a radiation element disposed in or on the dielectric substrate and facing the first ground electrode; and a first feed line configured to transmit a radio frequency signal from a feed circuit to the radiation element.

9. The antenna module according to claim 8, wherein the at least one filter device is connected between the feed circuit and the first feed line.

10. The antenna module according to claim 8, the antenna module further comprising:

the feed circuit, wherein the feed circuit includes a branch circuit for branching a radio frequency signal to be transmitted to the radiation element, and the at least one filter device is connected to the branch circuit.

11. The antenna module according to claim 8, further comprising:

a second feed line configured to transmit a radio frequency signal from the feed circuit to the radiation element, wherein the radiation element is configured to radiate a radio wave having a first polarization direction due to a radio frequency signal from the first feed line and a radio wave having a second polarization direction due to a radio frequency signal from the second feed line, and the at least one filter device is provided corresponding to the first feed line and the second feed line.

12. The antenna module according to claim 11, wherein a first filter device corresponding to the first feed line and a second filter device corresponding to the second feed line are provided in different layers of the dielectric substrate, the antenna module further comprises a second ground electrode disposed in a layer between the layer of the first filter device and the layer of the second filter device, and the first filter device and the second filter device at least partially overlap each other when viewed in plan in a direction normal to the antenna module.

13. A communication device, comprising:

the antenna module according to claim 8.

14. The filter device according to claim 2, further comprising:

a third coupling line electrically connected in parallel to the first coupling line, wherein the second coupling line is provided between the first coupling line and the third coupling line.

15. The filter device according to claim 3, further comprising:

a fourth coupling line electrically connected in parallel to the second coupling line, wherein the first coupling line is provided between the second coupling line and the fourth coupling line.

16. The filter device according to claim 1, further comprising:

a fourth coupling line electrically connected in parallel to the second coupling line, wherein the first coupling line is provided between the second coupling line and the fourth coupling line.

17. The filter device according to claim 2, further comprising:

a first matching line connected between the input end and the first coupling line; and a second matching line connected between the output end and the second coupling line.

18. The filter device according to claim 3, further comprising:

a first matching line connected between the input end and the first coupling line; and a second matching line connected between the output end and the second coupling line.

19. The filter device according to claim 4, further comprising:

a first matching line connected between the input end and the first coupling line; and a second matching line connected between the output end and the second coupling line.

20. The filter device according to claim 2, wherein the stub is an open stub.

* * * * *